United States Patent
Kim et al.

(10) Patent No.: US 11,325,525 B2
(45) Date of Patent: May 10, 2022

(54) ASYNCHRONOUS CONTROL SYSTEM IN CAMERA BUILT-IN LAMP AND METHOD THEREOF

(71) Applicant: HYUNDAI MOBIS CO., LTD., Seoul (KR)

(72) Inventors: Myeong Je Kim, Yongin-si (KR); Jung Sub Lim, Yongin-si (KR); Han Seong Yu, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/116,178

(22) Filed: Dec. 9, 2020

(65) Prior Publication Data
US 2022/0001791 A1 Jan. 6, 2022

(30) Foreign Application Priority Data
Jul. 3, 2020 (KR) .................. 10-2020-0082357

(51) Int. Cl.
*B60Q 1/14* (2006.01)
*B60Q 1/00* (2006.01)
*B60Q 1/08* (2006.01)

(52) U.S. Cl.
CPC ........... *B60Q 1/143* (2013.01); *B60Q 1/0023* (2013.01); *B60Q 1/085* (2013.01); *B60Q 2300/41* (2013.01); *B60Q 2300/42* (2013.01)

(58) Field of Classification Search
CPC ........... B60Q 2300/42; B60Q 2300/41; B60Q 1/1423; B60Q 2300/056; B60Q 1/143;
(Continued)

(56) References Cited

U.S. PATENT DOCUMENTS

2019/0174042 A1* 6/2019 Johannessen ............ H04N 7/18
2020/0271786 A1* 8/2020 Mano ..................... G01S 17/18
2021/0025560 A1* 1/2021 Watano .................. G01S 7/4813

FOREIGN PATENT DOCUMENTS

JP  3930268 B2  6/2007
JP  5348100 B2  11/2013
(Continued)

OTHER PUBLICATIONS

Office Action issued in corresponding Korean application No. 10-2020-0082357 dated Jan. 6, 2022.

*Primary Examiner* — Wei (Victor) Y Chan
(74) *Attorney, Agent, or Firm* — NovoTechIP International PLLC

(57) ABSTRACT

According to an embodiment of the present disclosure, an asynchronous control system of a camera built-in lamp may include a headlight module including a one-side headlight module integrated with a first camera and a first light source, and an other-side headlight module integrated with a second camera and a second light source, and transmits a sync signal for controlling driving of the first light source and the second light source to the one-side headlight module and the other-side headlight module, causes the first light source and the second light source to be turned off when the shutters of the first camera and the second camera operate to be opened, and causes the first light source and the second light source to be turned on when the shutters of the first camera and the second camera operate to be closed.

13 Claims, 4 Drawing Sheets

(58) Field of Classification Search
CPC .... B60Q 1/0023; B60Q 1/14; B60Q 2300/45; B60Q 1/085; B60Q 2300/122; B60Q 1/30; B60Q 1/00; B60Q 1/0011; B60Q 1/0035; B60Q 1/04; B60Q 1/24; B60Q 1/2611; B60Q 1/268; B60Q 1/28; B60Q 1/32

See application file for complete search history.

(56) References Cited

FOREIGN PATENT DOCUMENTS

| | | |
|---|---|---|
| JP | 2017-193239 A | 10/2017 |
| KR | 10-2009-0116559 A | 11/2009 |
| KR | 10-2019-0080454 A | 7/2019 |
| KR | 10-2019-0130057 A | 11/2019 |

* cited by examiner

ASYNCHRONOUS CONTROL SYSTEM IN CAMERA BUILT-IN LAMP AND METHOD THEREOF

CROSS-REFERENCE TO RELATED APPLICATION

This application claims the benefit of priority to Korean Patent Application No. 10-2020-0082357, filed in the Korean Intellectual Property Office on Jul. 3, 2020, the entire contents of which are incorporated herein by reference.

TECHNICAL FIELD

The present disclosure relates to an asynchronous control system of a camera built-in lamp, and a method thereof, and more particularly, to an asynchronous control system of a camera built-in lamp that may prevent the image distortion of a camera by link a lamp light source controller with a camera to improve the image quality of the camera built-in lamp, and a method thereof.

BACKGROUND

In general, a camera (or a camera module) for improving a driver's convenience and supporting the driver is installed in a vehicle. For example, the camera includes a front camera, a rear camera, an around-view monitoring system, a black box, or the like.

The image (e.g., image information) captured by the camera is transmitted to a camera controller that processes camera images to generate various pieces of driver assistance information such as vehicle information, traffic light information, pedestrian information, and obstacle information.

The camera installed in the vehicle performs various functions through a single cable, and performs functions such as the power supply to a camera, the transmission of a video signal, the transmission/reception of a control signal (I2C), and the like, using the single cable.

That is, the single cable connected to the camera is input to a camera controller, and the camera controller may analyze and process image information to output an image signal through a vehicle internal network.

On the other hand, when a camera is built in the headlamp of a vehicle, the camera is greatly affected by the image quality caused by a lamp light source.

In particular, the camera in a headlamp integrated with a sensor increases a sensor gain in a dark environment. At this time, an image is distorted by the reflected light reflected from an outer lens.

SUMMARY

The present disclosure has been made to solve the above-mentioned problems occurring in the prior art while advantages achieved by the prior art are maintained intact.

An aspect of the present disclosure provides an asynchronous control system and method of a camera built-in lamp that prevents a camera built in a headlamp from being affected by the reflected light, by including an integrated controller integrating a camera into a headlamp of a vehicle and preventing an LED and a camera from operating simultaneously in the same headlamp through pulse width modulation (PWM) control of the LED that is the light source of the headlamp, thereby preventing the image captured by the camera from being distorted to improve the image quality.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an asynchronous control system of a camera built-in lamp may include a headlight module including a one-side headlight module integrated with a first camera and a first light source, and an other-side headlight module integrated with a second camera and a second light source, and a vehicle controller that alternately sets an opening time of a shutter of the first camera provided in the one-side headlight module, and an opening time of a shutter of the second camera provided in the other-side headlight module, transmits a sync signal for controlling driving of the first light source and the second light source to the one-side headlight module and the other-side headlight module, causes the first light source and the second light source to be turned off when the shutters of the first camera and the second camera operate to be opened, and causes the first light source and the second light source to be turned on when the shutters of the first camera and the second camera operate to be closed.

In an embodiment, the headlight module may include a first lamp module integrated with the first camera and the first light source, and a second lamp module integrated with the second camera and the second light source.

In an embodiment, the vehicle controller may generate the sync signal for continuously forming a high signal and a low signal to transmit the sync signal to the first lamp module and the second lamp module.

In an embodiment, the vehicle controller may activate the first lamp module at the high signal, may cause the shutter of the first camera to be opened at the high signal, and may cause the first light source to be turned off.

In an embodiment, the vehicle controller may cause the shutter of the second camera to be closed, and may cause the second light source to be turned on, when activating the first lamp module at the high signal.

In an embodiment, the vehicle controller may activate the second lamp module at the low signal, causes the shutter of the second camera to be opened at the low signal, and may cause the second light source to be turned off.

In an embodiment, the vehicle controller may operate the shutter of the first camera to be closed, and may cause the first light source to be turned on, when activating the second lamp module at the low signal.

According to an aspect of the present disclosure, an asynchronous control method of a camera built-in lamp may include alternately setting, by a vehicle controller, an opening time of a shutter of a first camera provided in an one-side headlight module integrated with the first camera and a first light source, and an opening time of a shutter of a second camera provided in an other-side headlight module integrated with the second camera and a second light source, and transmitting a sync signal for controlling driving of the first light source and the second light source to the one-side headlight module and the other-side headlight module, and causing the first light source and the second light source to be turned off when the shutters of the first camera and the second camera operate to be opened, and causing the first light source and the second light source to be turned on when the shutters of the first camera and the second camera operate to be closed, through the setting.

In an embodiment, the setting may include generating the sync signal for continuously forming a high signal and a low signal to transmit the sync signal to the first lamp module integrated with the first camera and the first light source, and the second lamp module integrated with the second camera and the second light source.

In an embodiment, the causing of the first light source and the second light source may include activating the first lamp module at the high signal, and causing the shutter of the first camera to be opened at the high signal and causing the first light source to be turned off.

In an embodiment, the causing of the first light source and the second light source may include causing the shutter of the second camera to be closed, and causing the second light source to be turned on, when activating the first lamp module at the high signal.

In an embodiment, the causing of the first light source and the second light source may include activates the second lamp module at the low signal, and operating the shutter of the second camera to be opened at the low signal, and causing the second light source to be turned off.

In an embodiment, the causing of the first light source and the second light source may include causing the shutter of the first camera to be closed, and causing the first light source to be turned on, when activating the second lamp module at the low signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
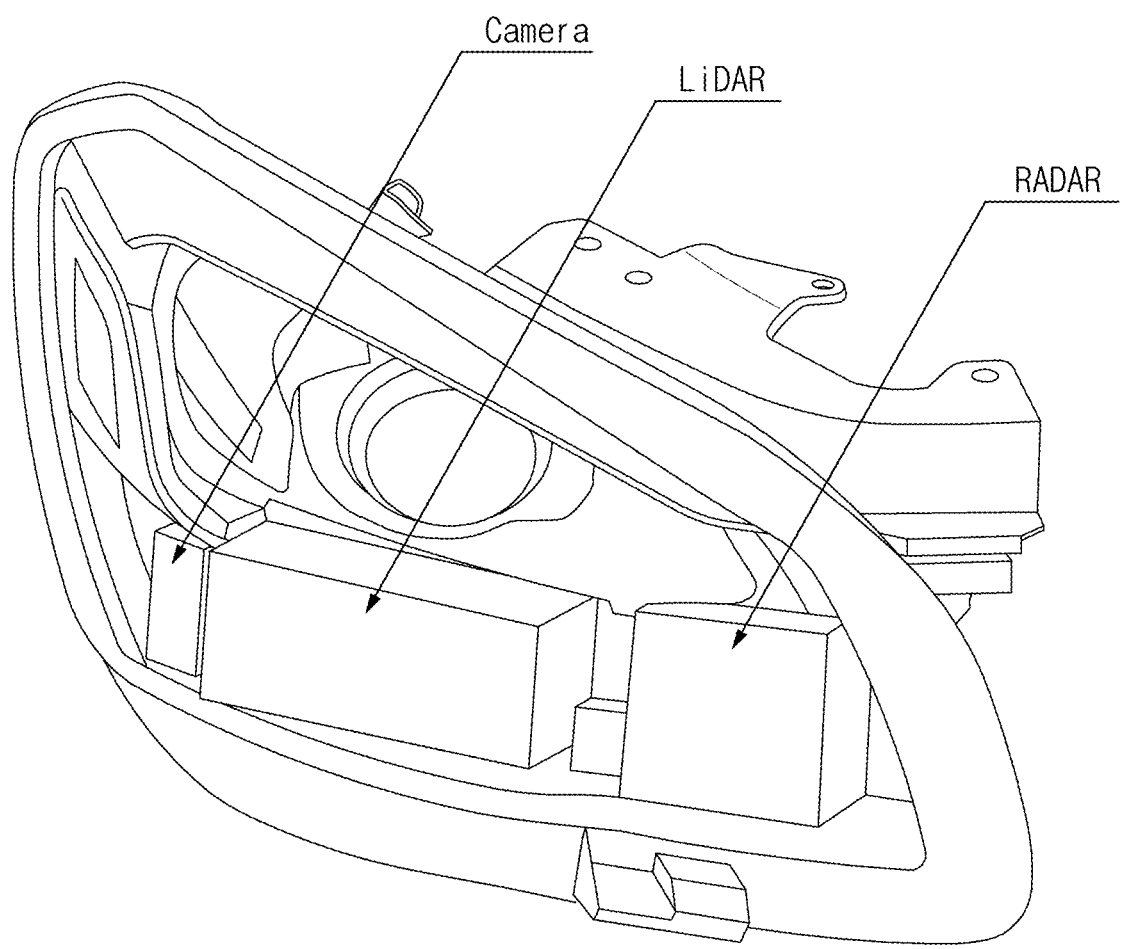
FIG. 1 is a view illustrating a head lamp constituting an asynchronous control system for a lamp built-in camera according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 3.

FIG. 1 is a view illustrating a head lamp constituting an asynchronous control system for a lamp built-in camera according to an embodiment of the present disclosure. FIG. 2 is a block diagram illustrating an asynchronous control system of a camera built-in lamp according to an embodiment of the present disclosure. FIG. 3 is a diagram for describing a process of controlling a headlamp through an asynchronous control system of a camera built-in lamp according to an embodiment of the present disclosure.

Figure 2:
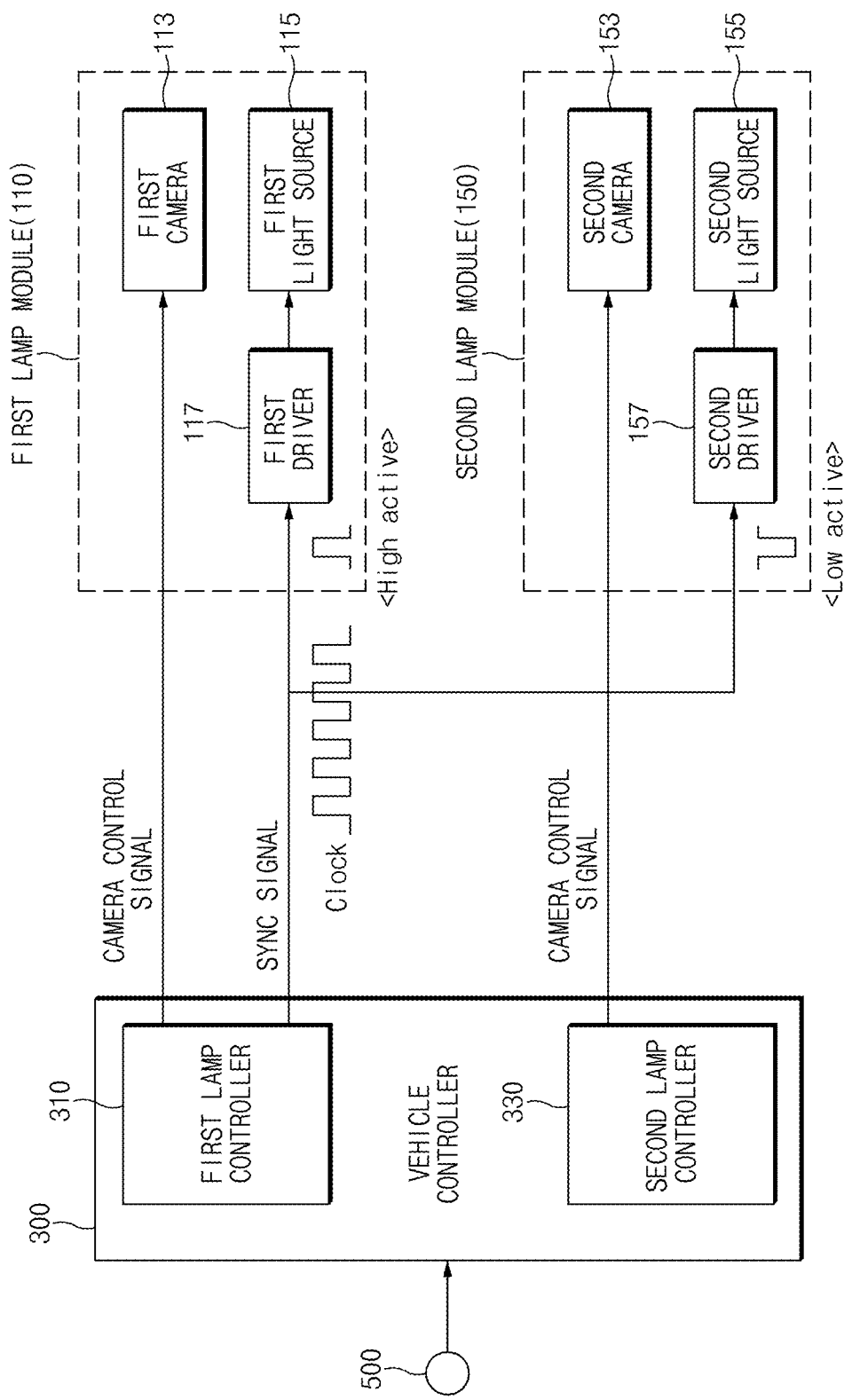
FIG. 2 is a block diagram illustrating an asynchronous control system of a camera built-in lamp according to an embodiment of the present disclosure.
Figure 3:
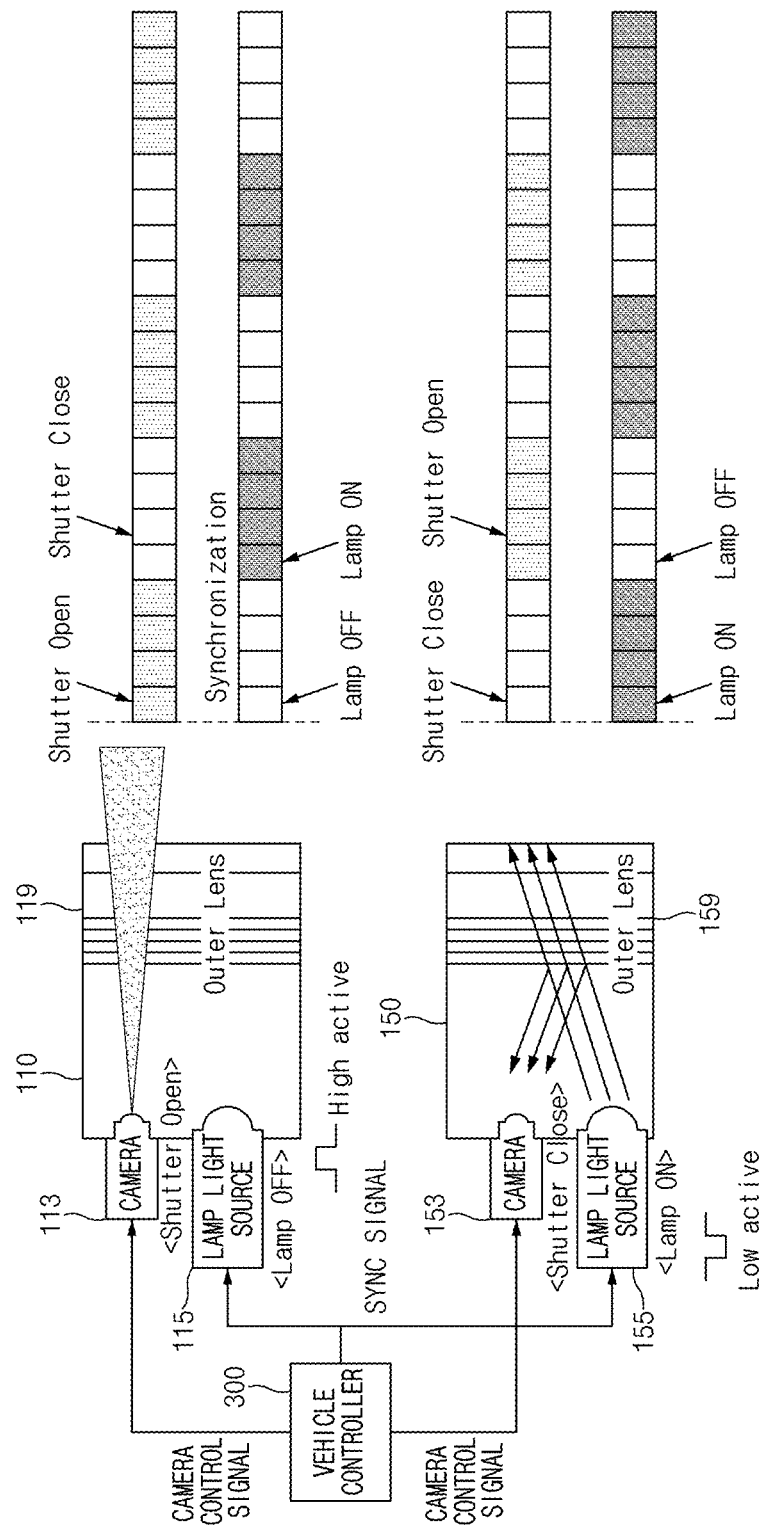
FIG. 3 is a diagram for describing a process of controlling a headlamp through an asynchronous control system of a camera built-in lamp according to an embodiment of the present disclosure.

Referring to FIGS. 2 and 3, the asynchronous control system of a camera built-in lamp according to an embodiment of the present disclosure may include a first lamp module 110, a second lamp module 150, and a vehicle controller 300.

The first lamp module 110 may integrally include a first camera 113, a first light source 115, and a first driver 117 that controls the driving of the first light source 115, as a headlight module provided on one side of the front of the vehicle.

The second lamp module 150 may integrally include a second camera 153, a second light source 155, and a second driver 157 that controls the driving of the second light source 155, as a headlight module provided on the other side of the front of the vehicle.

Each of the first light source 115 and the second light source 155 may be composed of a plurality of LEDs.

The vehicle controller 300 may include a first lamp controller 310 and a second lamp controller 330.

The first lamp controller 310 may transmit a signal for driving the shutter of the first camera 113 to the first camera 113 and may transmit a sync signal for driving the first light source 115 and the second light source 155 to the first driver 117 and the second driver 157.

The second lamp controller 350 may transmit a signal for driving the shutter of the second camera 153 to the second camera 153.

The vehicle controller 300 may alternately set a time required to drive the shutter of the first camera 113 through the first lamp controller 310 and a time required to drive the shutter of the second camera 153 through the second lamp controller 350, to be matched with the sync signal.

Accordingly, when the shutter of the first camera 113 is opened, the shutter of the second camera 153 may be closed; on the other hand, when the shutter of the second camera 153 is opened, the shutter of the first camera 113 may be closed.

The vehicle controller 300 may drive the first light source 115 and the second light source 155 in a pulse width modulation (PWM) method; the sync signal for driving the first light source 115 and the second light source 155 may be a clock signal in which a high state and a low state alternately repeated.

The PWM frequency for driving the first light source 115 and the second light source 155 may be 60 Hz or higher. Accordingly, the state in which the first light source 115 and the second light source 155 are turned on and off repeatedly may not be recognized by the human eye.

The vehicle controller 300 may control the first lamp module 110 to operate at the high time of the sync signal, and may control the second lamp module 150 to operate at a low time of the sync signal.

In this way, the vehicle controller 300 may alternately set a time required to drive the shutter of the first camera 113 through the first lamp controller 310 and a time required to drive the shutter of the second camera 153 through the second lamp controller 350, to be matched with the sync signal, and may differently set operating time points of the first light source 115 and the second light source 155 through the sync signal.

When the vehicle controller 300 activates the first lamp module 110 in a state where the sync signal is high, the shutter of the first camera 113 may be opened; the first light source 115 may be turned off; the shutter of the second camera 153 may be closed; the second light source 155 may be turned on.

On the other hand, when the vehicle controller 300 activates the second lamp module 150 in a state where the sync signal is low, the shutter of the second camera 153 may be opened; the second light source 155 may be turned off; the shutter of the first camera 113 may be closed; the first light source 115 may be turned on.

While the shutter of the first camera 113 is closed in the first lamp module 110, an image captured through the first camera 113, data, or the like may be transmitted to the vehicle controller 300.

Likewise, while the shutter of the second camera 153 is closed in the second lamp module 150, an image captured through the second camera 153, data, or the like may be transmitted to the vehicle controller 300.

In this way, the first camera 113 and the first light source 115 may not operate at the same time in the first lamp module 110, and the second camera 153 and the second light source 155 may not operate at the same time in the second lamp module 150.

Accordingly, the image captured through the first camera 113 or the second camera 153 is not affected by the reflected light reflected from the outer lens (119, 159), and thus distortion does not occur in the captured image, thereby improving image quality.

In the meantime, the vehicle controller 300 may receive a signal from the separately provided illuminance sensor 500, and may operate the asynchronous control method only in a low-illuminance state of specific criteria through a signal of the illuminance sensor 500.

Figure 4:
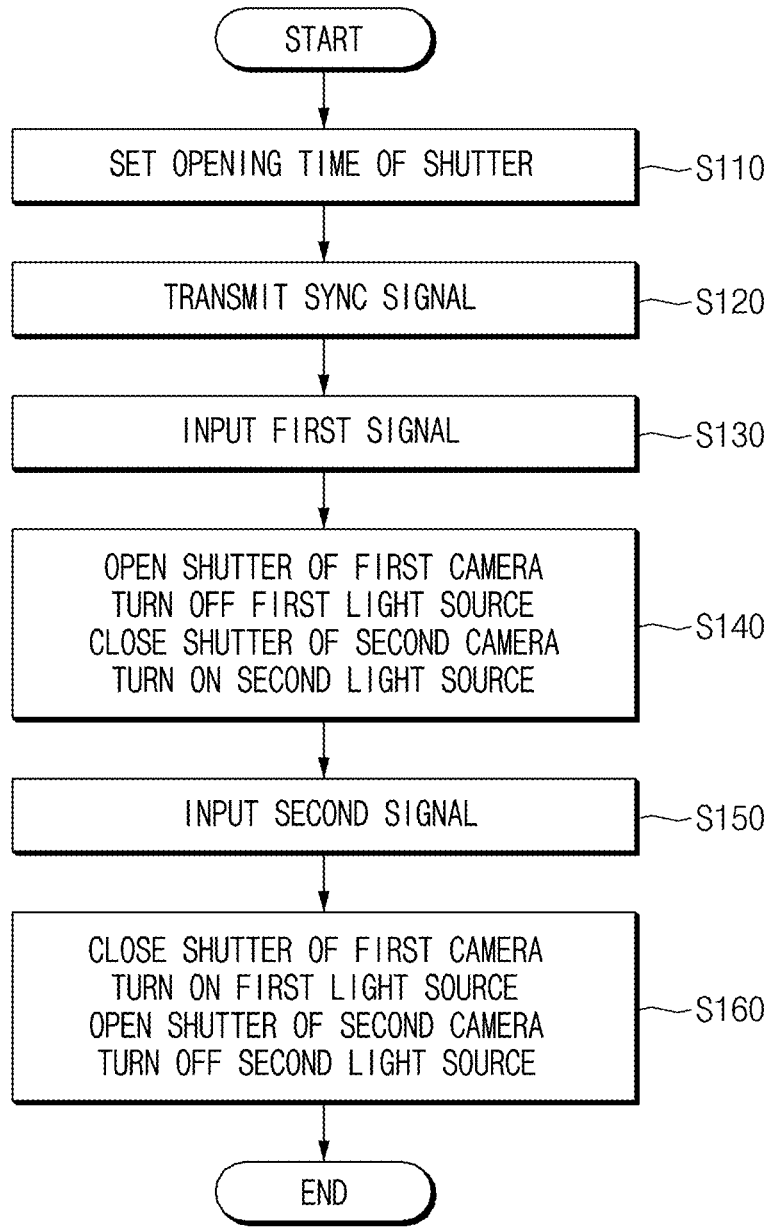
FIG. 4 is a flowchart for describing an asynchronous control method of a camera built-in lamp according to an embodiment of the present disclosure.

Hereinafter, the asynchronous control method of a camera built-in lamp according to another embodiment of the present disclosure will be described in detail with reference to FIG. 4. FIG. 4 is a flowchart for describing an asynchronous control method of a camera built-in lamp according to an embodiment of the present disclosure.

Hereinafter, it is assumed that the asynchronous control system of the camera built-in headlamp of FIG. 1 performs the process of FIG. 4.

First of all, the vehicle controller 300 may alternately set the opening time of each of camera shutters to the first lamp module 110 integrated with the first camera 113 and the first light source 115 and the second lamp module 150 integrated with the second camera 153 and the second light source 155 (S110).

Then, the vehicle controller 300 may generate a pulse-type sync signal for continuously forming a high signal and a low signal to transmit the sync signal to the first lamp module 110 and the second lamp module 150 (S120).

Next, the vehicle controller 300 may activate the first lamp module 110 at a high signal (S130); at the high signal, the shutter of the first camera 113 may operate to be opened; the vehicle controller 300 may cause the first light source 115 to be turned off; the shutter of the second camera 153 may operate to be closed; the vehicle controller 300 may cause the second light source 155 to be turned on (S140).

Then, the vehicle controller 300 may activate the second lamp module 150 at a low signal (S150); at the low signal, the shutter of the second camera 153 may operate to be opened; the vehicle controller 300 may cause the second light source 155 to be turned off; the shutter of the first camera 113 may operate to be closed; the vehicle controller 300 may cause the first light source 115 to be turned on (S160).

As described above, according to an embodiment of the present disclosure, according to the asynchronous control system and method of a camera built-in lamp, it is possible to prevent a camera built in a headlamp from being affected by the reflected light, by including an integrated controller integrating a camera into a headlamp of a vehicle and preventing an LED and a camera from operating simultaneously in the same headlamp through PWM control of the LED that is the light source of the headlamp, thereby preventing the image captured by the camera from being distorted to improve the image quality.

In the meantime, according to an embodiment of the present disclosure, the asynchronous control system of a camera built-in lamp according to steps S110 to S160 may be programmed and stored in a computer-readable medium.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The present technology prevents a camera built in a headlamp from being affected by the reflected light, by including an integrated controller integrating a camera into a headlamp of a vehicle and preventing an LED and a camera from operating simultaneously in the same headlamp through PWM control of the LED that is the light source of the headlamp, thereby preventing the image captured by the camera from being distorted to improve the image quality.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for asynchronously controlling a headlight module, comprising:
   the headlight module comprising:
      a first headlight module located at a first side of a vehicle and comprising a first camera and a first light source; and
      a second headlight module located at a second side of the vehicle and comprising a second camera and a second light source; and
   a vehicle controller configured to:

cause a first shutter of the first camera and a second shutter of the second camera to open alternately such that one of the first and second shutters is open when the other of the first and second shutters is closed;

cause the first light source to be turned off and the second light source to be turned on while the first shutter of the first camera is open and the second shutter of the second camera is closed at the same time; and cause the first light source to be turned on and the second light source to be turned off while the first shutter of the first camera is closed and the second shutter of the second camera is open at the same time.

2. The system of claim 1, wherein:

the first headlight module comprises a first lamp module comprising the first camera and the first light source, and the second headlight module comprises a second lamp module comprising the second camera and the second light source.

3. The system of claim 1, wherein the vehicle controller is further configured to generate a sync signal comprising a high signal and a low signal for transmission to the first and second headlight modules.

4. The system of claim 3, wherein the first headlight module is configured, in response to receiving the high signal, to open the first shutter of the first camera and turn off the first light source.

5. The system of claim 3, wherein the second headlight module is configured, in response to receiving the high signal, to close the shutter of the second camera and turn on the second light source.

6. The system of claim 3, wherein the second headlight module is configured, in response to receiving the low signal, to open the second shutter of the second camera and turn off the second light source.

7. The system of claim 3, wherein the first headlight module is configured, in response to receiving the low signal, to close the first shutter of the first camera and turn on the first light source.

8. A method of asynchronously controlling a headlight module comprising first and second headlight modules, the first headlight module located at a first side of a vehicle and comprising a first camera and a first light source, and the second headlight module located at a second side of the vehicle and comprising a second camera and a second light source, the method comprising:

causing a first shutter of the first camera and a second shutter of the second camera to open alternately such that one of the first and second shutters is open when the other of the first and second shutters is closed;

causing the first light source to be turned off and the second light source to be turned on while the first shutter of the first camera is open and the second shutter of the second camera is closed at the same time; and causing the first light source to be turned on and the second light source to be turned off while the first shutter of the first camera is closed and the second shutter of the second camera is open at the same time.

9. The method of claim 8, further comprising receiving a sync signal comprising a high signal and a low signal.

10. The method of claim 8, further comprising, in response to receiving the high signal, opening the first shutter of the first camera and turning off the first light source.

11. The method of claim 8, further comprising, in response to receiving the high signal, closing the second shutter of the second camera and turning on the second light source.

12. The method of claim 8, further comprising, in response to receiving the low signal, closing the first shutter of the first camera and turning on the first light source.

13. The method of claim 8, further comprising, in response to receiving the low signal, opening the second shutter of the second camera and turning off the second light source.

* * * * *